Patented Nov. 4, 1952

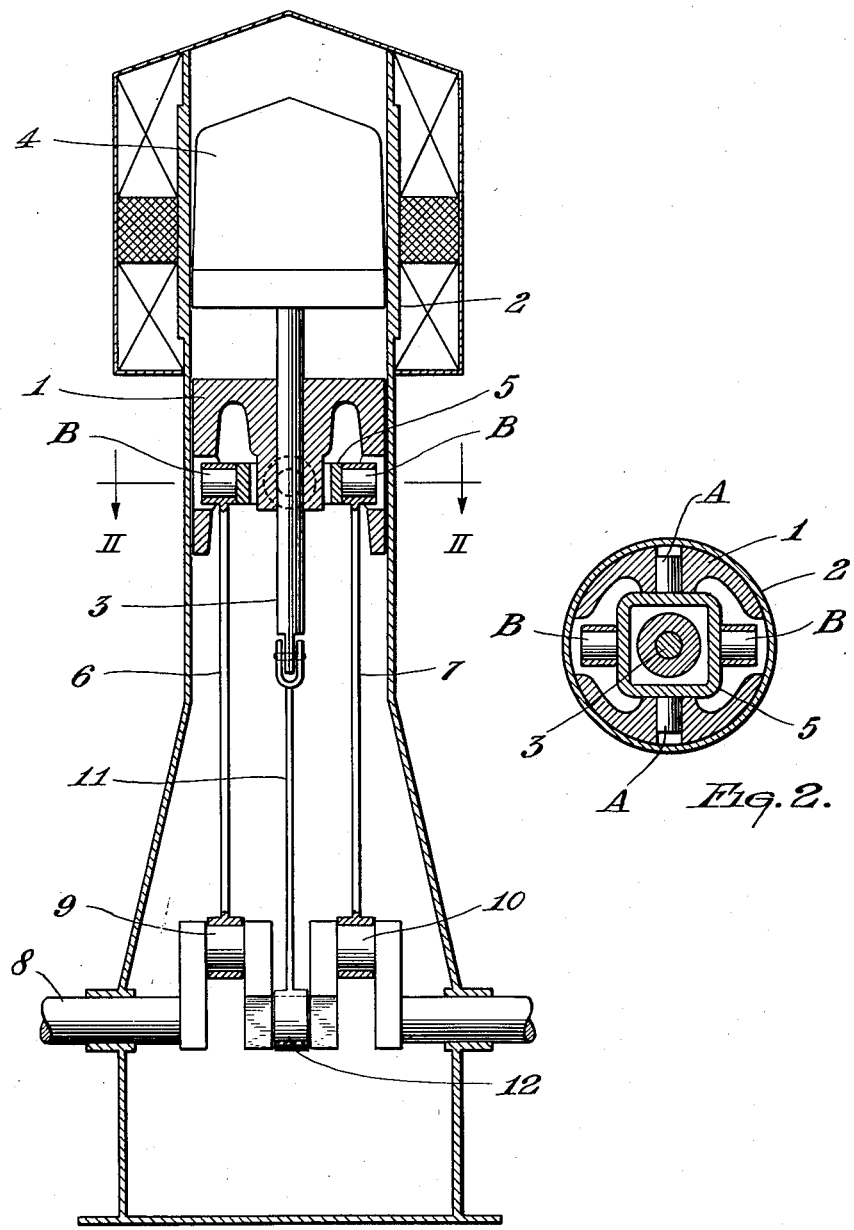

2,616,247

UNITED STATES PATENT OFFICE 2,616,247

PISTON AND CONNECTING ROD ASSEMBLY

August Albert Liebe, Eindhoven, Netherlands, assignor to Hartford National Bank and Trust Company, Hartford, Conn., as trustee Application November 29, 1949, Serial No. 130,057
In the Netherlands January 18, 1949

1 Claim. (Cl. 60—24)

This invention relates to arrangements comprising a piston and a connecting rod mechanism, the connecting rod mechanism being coupled to the piston at two points.

As a rule, a connecting rod mechanism is coupled to a piston at the center of the sectional area of the piston. However, in certain cases, it is not possible to secure the connecting rod mechanism at this area, for example, if a piston rod associated with a second piston is taken through the center of the first piston. Furthermore, a piston may have a central aperture through which a working medium is supplied to the space acted upon by the piston. In such cases, the center of the piston is not available for the connection of the connecting rod mechanism which, as a rule, is connected to the piston at two points. However, in this connection the difficulty arises in which the piston is required to be secured to the connecting rod mechanism in such a manner that the piston does not tend to assume an inclined position, since it is usually difficult to provide the center line of the connecting pins at right angles to the center of the piston. If the piston does not reciprocate in the cylinder, in an exactly straight line, additional friction may be produced or even abrasion of the contact surfaces may occur. A further risk occurs, if the crank shaft is not exactly at right angles to the center line of the piston, or if the connecting rod can bend, owing to its asymmetrical shape. In this case also additional friction or abrasion might occur.

The object of the invention is to provide an arrangement comprising a piston and a connecting rod mechanism in which the piston does not take up such an inclined position and additional friction and abrasion are reduced.

According to the invention an arrangement comprising a piston and a connecting rod mechanism which is secured to the piston at two points is characterized in that the connecting rod mechanism is secured to the piston so as to be movable about two axes at right angles to one another, it being possible that these two axes in turn are at right angles to the direction of movement of the piston.

The piston can thus turn about any arbitrary axis at right angles to its center line, so that it is capable of taking up a favorable position.

A preferred, simple construction is obtained by coupling the connecting rod mechanism to the piston by means of a so-called Cardan ring. This ring may be secured to the piston by means of two journals and to the connecting rod mechanism by means of two further journals.

The problem referred to above may arise with a connecting rod provided with a fork at the piston end, the two ends of the fork being secured to the piston. In a simple construction, the connecting rod mechanism is constituted by a system of two parallel rods. Each of these rods is secured at one end to the piston and at the other end to a separate crank of the common crankshaft. Without the use of the arrangement according to the invention, there would, in this case, also be a risk of the piston assuming an inclined position.

This risk is involved not only due to inaccuracy in the manufacture of crank-shaft or connecting rod but also due to different lengths of the connecting rods or to different strokes owing to inaccuracy of the crank shaft.

If the connecting rod mechanism is constituted by a system of two parallel rods, it will in certain cases be preferable, to couple the two rods with one another, thus providing a construction which is mechanically stronger.

In order that the invention may be more clearly understood and readily carried into effect, it will now be described more fully with reference to one embodiment thereof shown in the accompanying diagrammatic drawing, given by way of example, in which:

Fig. 1 is a sectional view of a hot-gas reciprocating engine comprising a piston and connecting rod mechanism according to the invention, taken on the center line of the piston, and Fig. 2 is a sectional view of the piston taken on the line II—II of Fig. 1.

Referring now to the drawing, a piston 1 is adapted to reciprocate in a cylinder 2. A bore is provided in the piston 1 along its center line and a piston rod 3 of a displacer 4 is adapted to reciprocate through this bore. The piston 1 is provided with a so-called Cardan ring 5, which is rotatably secured to the piston by means of journals A—A and to connecting rods 6 and 7 by means of journals B—B. The connecting rods 6 and 7 are secured to the crank-shaft 8, each of them to a separate crank 9 and 10 respectively. The displacer 4 is connected by the rod 3 and a connecting rod 11 to a crank 12 of the crankshaft 8. The crank 12 makes an angle of for example, 90° to the cranks 9 and 10. Owing to the Cardan joint, the piston is now capable of assuming a favorable position in the cylinder 2. It will be obvious that the connecting rods 6 and 7 may, as an alternative, be secured to the journals A—A of the Cardan ring in a resilient manner. In this case the centers of rotation at the journals A—A are dispensed with. As a further alternative the connection B—B may be made resilient.

What I claim is:

A hot gas engine comprising, a cylinder, a working piston within said cylinder with a bore extending therethrough along the axis thereof, a displacer piston within said cylinder, a crankshaft, a pair of connecting rods mounted on said crankshaft, a Cardan ring lying in plane perpendicular to the piston axis connecting said pair of connecting rods with said piston, a third connecting rod mounted on said crankshaft and extending through said piston bore within said Cardan ring, said third connecting rod being secured to the displacer piston.

AUGUST ALBERT LIEBE.

REFERENCES CITED

The following references are of record in the file of this patent:

UNITED STATES PATENTS

| Number | Name | Date |
| --- | --- | --- |
| 389,045 | Bair | Sept. 4, 1888 |
| 966,032 | Mann | Aug. 2, 1910 |
| 1,213,819 | Bearup | Jan. 30, 1917 |
| 1,360,974 | Pattison | Nov. 30, 1920 |
| 1,588,137 | Myers | June 8, 1926 |
| 2,188,831 | Crawford | Jan. 30, 1940 |
| 2,263,647 | Ryder | Nov. 25, 1941 |
| 2,395,911 | Schoenfeld | Mar. 5, 1946 |

FOREIGN PATENTS

| Number | Country | Date |
| --- | --- | --- |
| 1,565 | Great Britain | May 4, 1874 |
| 16,841 | Great Britain | July 23, 1907 |
| 54,166 | Netherlands | Feb. 16, 1943 |